(12) United States Patent
Ihm et al.

(10) Patent No.: US 6,541,527 B1
(45) Date of Patent: Apr. 1, 2003

(54) PROCESS FOR PREPARING POST-CROSSLINKED POLYMER BEAD WHOSE SURFACE AREA AND PORE VOLUME ARE INCREASED

(75) Inventors: Son Ki Ihm, Seoul (KR); Chang Gun Oh, Ulsan (KR); Jou Hyeon Ahn, Jinjoo (KR); Jin Eun Jang, Changnyong (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 0 days.

(21) Appl. No.: 09/483,912

(22) Filed: Jan. 18, 2000

(30) Foreign Application Priority Data

Jan. 16, 1999 (KR) .......................................... 1999-1166

(51) Int. Cl.$^7$ ............................. C08J 9/36; C08J 9/40; C08J 9/42
(52) U.S. Cl. ............................. 521/53; 521/56; 521/59; 521/146; 521/148; 521/149
(58) Field of Search ................................. 521/146, 148, 521/149, 56, 59, 53

(56) References Cited

U.S. PATENT DOCUMENTS

| | | | | |
|---|---|---|---|---|
| 4,191,813 A | * | 3/1980 | Reed | 521/31 |
| 4,192,920 A | | 3/1980 | Amick | |
| 4,263,407 A | * | 4/1981 | Reed, Jr | 521/33 |
| 4,950,332 A | * | 8/1990 | Stringfield et al. | 502/402 |
| 5,416,124 A | | 5/1995 | Stringfield | |
| 5,460,725 A | | 10/1995 | Stringfield | |
| 5,504,163 A | | 4/1996 | Tegen et al. | |
| 5,512,604 A | * | 4/1996 | Demopolis | 521/25 |
| 5,519,064 A | * | 5/1996 | Stringfield et al. | 521/54 |
| 5,683,800 A | | 11/1997 | Stringfield et al. | |

OTHER PUBLICATIONS

Edward J. Simpson, et al. "An Emerging Class of Volatile Organic Compound Sorbents: Friedel–Crafts Modified Polystyrenes. 1. Synethesis, Characterization, and Performance in Aqueous–and Vapor–Phase Applications", *Ind. Eng. Chem. Res.*, 35:1195–1205 (1996).

Edward J. Simpson et al., "An Emerging Class of Volatie Organic Compound Sorbents: Friedel–Crafts Modified Polystyrenes. 2. Performance Comparison with Commerically–Available Sorbents and Isotherm Analysis", *Ind. Eng. Chem. Res.*, 35:4635–4645 (1996).

Alexander V. Pastukhov et al., "Hypercrosslinked Polystyrene: A Polymer in a Non–Classical Physical State", Journal of Polymer Science: Part B: Polymer Physics, 37:2323–2333 (1999).

V.V. Azanova and J. Hradil, Sorption Properties of Macroporous and Hypercrosslinked Copolymers, Reative and Functional Polymers 41:163–175 (1999).

\* cited by examiner

*Primary Examiner*—Morton Foelak
(74) *Attorney, Agent, or Firm*—Darby & Darby

(57) ABSTRACT

The present invention relates to a process for preparing post-crosslinked polymer bead with increased surface area and pore volume, and suitable pore size, allowing the separation of organic compounds by post-crosslinking gel-type copolymer bead whose crosslinking degree is low and initial surface area is small, or macroporous-type copolymer bead whose crosslinking degree is high and initial surface area is intermediate in the presence of a Friedel-Crafts catalyst, and polymer beads produced thereby. Though the surface area and pore volume of polymer beads may be varied depending on physical properties of copolymer beads and Friedel-Crafts reaction conditions, the present invention provides polymer beads with larger surface area than that of commercially available polymeric adsorbents produced by the conventional method employing a porogen only. Further, the polymer beads may be used as polymeric adsorbent and catalyst carrier, since they exhibit a high adsorption capacity for organic compounds in an aqueous solution, and chemically modified ones may be employed as polymer carrier, ion-exchange resin, and chelate resin.

18 Claims, 1 Drawing Sheet

PROCESS FOR PREPARING POST-CROSSLINKED POLYMER BEAD WHOSE SURFACE AREA AND PORE VOLUME ARE INCREASED

FIELD OF THE INVENTION

The present invention relates to a process for preparing post-crosslinked polymer bead whose surface area and pore volume are increased, more specifically, to a method for controlling surface area and pore volume of polymer bead by post-crosslinking gel-type copolymer bead whose crosslinking degree is low and surface area is small, or macroporous-type copolymer bead whose crosslinking degree is high and surface area is intermediate in the presence of a Friedel-Crafts catalyst, a process for preparing post-crosslinked polymer bead with increased surface area and pore volume, and sufficient pore size allowing the separation of organic compounds, and polymer beads produced thereby.

BACKGROUND OF THE INVENTION

Various kinds of toxic compounds contained in the industrial waste water have been generated, as the industrialization progresses. Naturally, a method for removing or recovering the toxic organic compounds has been required in the art. Even though highly selective chromatographic adsorbents and separatory membranes have gained wide acceptance among the users, needs have continued to exist for the development of a material which possesses better separation power for organic compounds than conventional adsorbents. In particular, efficient means for separating biologically active materials and proteins have been explored as the biotechnology develops rapidly.

Polymeric adsorbents employed in that purpose include two types of commercially available adsorbent resins, i.e., porogen-modified styrene/divinylbenzene adsorbents and methylene-bridged styrene/divinylbenzene adsorbents.

Porogen- or diluent-modified styrene/divinylbenzene adsorbent which is collectively referred to as macroporous resin, porogens such as toluene, isooctane, and amylalcohol are added to control the pore size in the course of polymerization, whereby relatively large pore size can be formed. Crosslinking monomer of divinylbenzene ranging from 0.35 to 0.80 by weight fraction is employed to the polymerization, to give stabilization and rigidity to the polymer structure while preventing pore collapse due to large pore size. However, it has revealed a critical problem that polymer beads with increased surface area and high porosity for separator purposes cannot be easily obtained by the afore-mentioned method.

On the other hand, the methylene-bridged styrene/divinylbenzene adsorbents, are prepared from lightly crosslinked gel or macroporous polymers, whose crosslinking degree is typically less than 0.08 weight fraction. The polymers possess good swelling characteristics, and undergo considerable expansion during methylene-bridging process, which endows the adsorbents with large surface area. Accordingly, the polymeric adsorbents provide a high adsorption capacity associated with large surface area, while maintaining low adsorption kinetics associated with microporosity.

As fully described above, the porogen-modified styrene/divinybenzene adsorbents provide a high level of macroporosity and relatively small surface area, thus show desirable adsorption kinetics but low adsorption capacity, while the methylene-bridged styrene/divinylbenzene adsorbents have drawbacks of low adsorption kinetics due to the microporosity. Thus, it would be desirable to combine the advantages of high adsorption capacity and kinetics in a single polymeric adsorbent, by controlling critical parameters to determine the surface area and pore volume.

U.S. Pat. No. 5,416,124 describes a process for preparing polymeric adsorbents with increased surface area and pore volume which comprises the steps of: i) preparing crosslinked copolymer beads, ii) halogenation of the copolymer beads, and iii) post-crosslinking the halogenated copolymer beads. However, the process is less satisfactory in a sense that formation of pore and increment of surface area are carried out simultaneously, preventing polymer beads from easy control of pore size.

Further, a method for increasing surface area by post-crosslinking styrene/divinylbenzene coplymer with crosslinking agent such as chloromethyl ether and chloroethyl ether in the presence of a Friedel-Crafts catalyst has been proposed in the art. However, pore size control and large surface area cannot be realized, since the pore formation and surface area increment are also performed in a simultaneous manner.

Under the circumstances, there are strong reasons for exploring and developing a novel process for preparing polymer beads by separating the steps of forming pore structure and expanding surface area to control pore size.

SUMMARY OF THE INVENTION

The present inventors have made an effort to solve the problems of the prior processes, and prepared polymer beads with increased surface area and pore volume by polymerizing a suspension of organic phase in an aqueous phase to prepare copolymer beads having chloromethy groups with suitable pore structure(mesoporosity and macroporosity) associated with adsorption kinetics, and post-crosslinking the copolymer beads in a swollen state in the presence of a Friedel-Crafts catalyst.

A primary object of the present invention is, therefore, to provide a method for controlling surface area and pore volume in polymer beads to improve adsorption capacity and adsorption kinetics.

The other object of the invention is to provide a process for preparing polymer beads whose surface area and pore volume are increased.

Another object of the invention is to provide polymer beads with increased surface area and pore volume.

BRIEF DESCRIPTION OF DRAWINGS

The above and the other objects and features of the present invention will become apparent from the following description given in conjunction with the accompanying drawings, in which.

DETAILED DESCRIPTION OF THE INVENTION

Figure 1:
FIG. 1 is a scanning electron microscope microphotograph(×30,000) showing internal structure of polyvinylbenzylchloride beads containing a crosslinking monomer of 2 mol % divinylbenzene.

A method for controlling surface area and pore volume of polymer beads and a process for preparing polymer beads with increased surface area and pore volume are described in more detail by the following steps.

Step 1: Preparation of Copolymer Bead

An organic phase comprising monovinyl monomer, polyvinyl crosslinking monomer and initiator is subjected to a suspension-polymerization in an aqueous phase containing a suspension stabilizer to obtain a crosslinked copolymer bead which is a round-shaped chloromethylated polystyrene copolymer having a crossliking degree of 2 to 20 mol % with broad size distribution.

The crosslinked copolymer bead is obtained in a form of gel-type initially having small surface area or macroporous-type initially having intermediate surface area which is obtainable in the presence of a porogen. The porogenic solvent should meet the requirements as followings: it should be inert under polymerization conditions, i.e., neither interfere with or enter into the polymerization; and, it should be suitable for forming pores. The porogenic solvent includes toluene, heptane, isooctane, t-amylalcohol, isoamyl alcohol or mixture thereof, and it is comprised in a ratio of 50 to 80%(v/v) in the organic phase containing monomer, crosslinking monomer, initiator, and porogenic solvent.

The organic phase contains 0.25 to 0.98 molar fraction of a monovinyl monomer of vinylbenzylchloride, preferably vinylbenzylchloride; and a mixture of vinylbenzylchloride, and styrene, ethylstyrene, vinyltoluene, vinylpyridine, acrylonitrile or methyl methacrylate, most preferably a mixture of styrene and vinylbenzylchloride in a molar ratio of 1:3 to 3:1. Further, polyvinyl crosslinking monomer is comprised in a molar fraction of 0.005 to 0.80 against the total weight of monomers, which includes divinylbenzene or trivinylbenzene, more preferably divinylbenzene. The purity of commercially available divinylbenzene ranges 0.55 to 0.80 weight fraction.

The free-radical initiator includes azobisisobutyronitrile, t-butylperoxide, t-butylperoctoate, and t-butylperbenzoate, which is comprised in a ratio of 0.1 to 2.0 weight percent against the total monomers, though it may be varied depending on the type of polymerizing monomer.

Step 2: Post-crosslinking of Copolymer Bead

The copolymer bead obtained in Step 1 is swollen in a suitable swelling solvent, and post-crosslinked in the presence of a Friedel-Crafts catalyst to prepare a post-crosslinked polymer bead with increased surface area and pore volume, which allows its usage as polymeric adsorbent, ion-exchange resin or chelate resin.

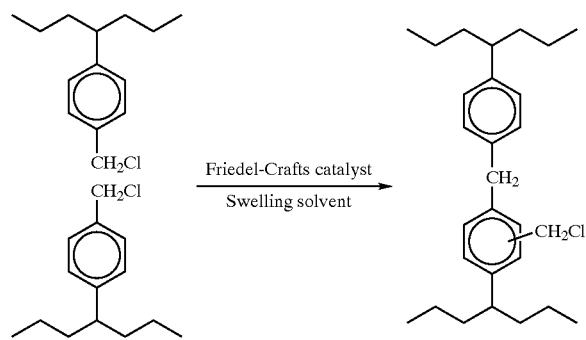

The copolymer bead obtained in Step 1 possesses a monovinyl monomer of vinylbenzylchloride, which allows to have chloromethyl (—CH$_2$Cl) functional group on its main chain. Friedel-Crafts reaction is carried out to form a methylene bridge between two copolymer chains by reacting the chloromethyl groups of main chains with aromatic rings of an adjacent copolymer chains in the presence of a Friedel-Crafts catalyst of Lewis acid. The surface area and pore volume of the post-crosslinked polymer bead is determined by the degree of methylene bridging, which depends on several factors of the crosslinking degree, the amount of chloromethyl substitutes of copolymer beads and Friedel-Crafts reaction conditions such as the type and amount of catalyst, temperature and time, and swelling solvent.

The Friedel-Crafts catalyst such as $AlCl_3$, $SnCl_4$, $FeCl_3$, $BF_3$, and HF, preferably $AlCl_3$, $SnCl_4$ and $FeCl_3$, is employed in a ratio of 0.02 to 1.2 weight fraction of the copolymer beads, preferably 0.2 to 0.6 weight fraction.

The swelling solvent should be suitable for expanding the copolymer structure and substantially inert during post-crosslinking process, which includes dichloroethane, dichlorobenzene, propylene dichloride, chlorobenzene and hexane. The temperature of the Friedel-Crafts reaction may be varied from 20 to 180° C. depending on the type of swelling solvent, preferably from 50 to 80° C.

In particular, copolymerization and post-crosslinking conditions have an effect on the surface area and pore volume of polymer bead, where the copolymeriation conditions include the molar ratio of styrene to vinylbenzylchlrodie, the amount of divinylbenzene as a crosslinking monomer, the degree of crosslinking, and the presence of porogen, and the post-crosslinking conditions include the type and amount of catalyst, reaction time, and the type of swelling solvent.

Surface area, pore size, and pore volume are examined by employing Micromeritics Accusorb 1100E nitrogen adsorption analyzer, and B.E.T. model is used for the calculation of surface area. The internal structure of copolymer and polymer beads are examined with JSM6400 Scanning Electron Microscope, the content of chloride in polymer beads is measured by employing Perkin Elmer Series II 2400 Analyzer. The swelling ratio was defined by the volume ratio of dried polymer beads to fully swollen polymer beads after saturation with a swelling solvent of toluene at 20° C. for 24 hours.

The present invention is further illustrated in the following examples, which should not be taken to limit the scope of the invention.

EXAMPLE 1

Preparation of Polyvinylbenzylchloride Bead

Polyvinylbenzylchloride beads were prepared from a mixture of vinylbenzylchloride monomer and divinylbenzene crosslinking monomer in a 500 ml glass reactor equipped with a condenser, nitrogen gas inlet, and a stirrer with two swings, by conventional suspension polymerization method employing an aqueous phase containing a mixture of 300 ml of distillated water as a suspending medium, 15 g of poly(diallyldimethylammonium chloride) as a suspension stabilizer and 1g of gelatin, and an organic phase containing a mixture of 61.78 g of vinylbenzylchloride monomer, 2 g of divinylbenzene as a crosslinking monomer, and 0.35 g of α,α'-azobisisobutyronitrile as an initiator.

The aqueous phase was added in the reactor and stirred at 40° C. to dissolve the suspension stabilizer, and added the organic phase and maintained for about 30 minutes to stabilize suspending droplets. Then, the reaction was initiated at an elevated temperature of 70° C. and a strring rate of 500 rpm. After 5 hours, the temperature was elevated to 80° C. and continued the reaction for 2 hours while stirring to complete the polymerization. After cooling to a room temperature, the resultant copolymer beads were collected by filtration and washed successively with distilled water and acetone, then with hot distilled water to remove remaining monomers and impurities. The remaining monomers and impurities were removed from copolymer beads with acetone again in Soxhlet extractor for 12 hours, then air dried. The air-dried copolymer beads were dried again at 80° C. for 24 hours in a vacuum oven, then kept in a desiccator. The copolymer beads thus obtained had a crosslinking degree of 2 mol % and a broad distribution of sizes such that beads having 200 to 1000 μm diameters are 93% by weight of total copolymer beads. FIG. 1 shows a SEM microphotograph(×30,000) of internal structure of polyvinylbenzylchloride beads obtained with 2 mol % of divinylbenzene as a crosslinking monomer. The copolymer beads having 200 to 1000 μm diameter were employed in the following Examples, whose surface area is 2 m$^2$/g, the content of chloride 22.23%, and swelling ratio 2.0, respectively.

Figure 2:
FIG. 2 is a scanning electron microscope microphotograph(×30,000) showing internal structure of post-crosslinked polymer beads obtained from copolymer beads of FIG. 1 in the presence of a Friedel-Crafts catalyst of $FeCl_2$.

To a three-neck flask was added 5 g of the copolymer beads and 100 ml of dichloroethane as a swelling solvent, and fully swelled at a room temperature for 2 hours. 2 g of FeCl3 as a Friedel-Crafts catalyst was subsequently added while vigorously stirring the swollen beads at the temperature of 0 to 5° C., and temperature was elevated to 80° C., continued the reaction for 12 hours. Then, the reactants were cooled to a room temperature and filtered to separate polymer beads. The separated polymer beads were washed several times with acetone and then methanol to remove metal impurities, washed with 0.5N HCl solution and methanol until the acid disappears, then dried in a vacuum oven. The resultant post-crosslinked polymer beads had surface area of 2090 m$^2$/g, pore volume of 1.20 cm$^3$/g, and chloride content of 3.76%, respectively. FIG. 2 is a SEM microphotograph of internal structure of post-crosslinked polymer beads obtained from copolymer beads shown in FIG. 1, indicating that the pore size is dramatically increased.

EXAMPLES 2–10

Employing copolymer beads having a crosslinking degree of 2 mol % obtained in Example 1, polymer beads were prepared under various reaction conditions depending on the type and amount of catalyst, and reaction temperature, whose properties are summarized in Table 1 below.

TABLE 1

| Example | Catalyst | Catalyst Amount (g) | Reaction Temp. (° C.) | Surface Area (m$^2$/g) | Cl Content (%) | Swelling Ratio (v/v) |
|---|---|---|---|---|---|---|
| 2 | FeCl$_3$ | 2 | 70 | 1890 | 3.93 | 1.24 |
| 3 | AlCl$_3$ | 2 | 70 | 1330 | 1.37 | 1.46 |
| 4 | SnCl$_4$ | 2 | 70 | 27 | 11.27 | 1.62 |
| 5 | FeCl$_3$ | 1 | 70 | 1860 | 3.80 | 1.46 |
| 6 | AlCl$_3$ | 1 | 70 | 1 | 11.65 | 1.84 |
| 7 | SnCl$_4$ | 1 | 70 | 34 | 12.14 | 1.78 |
| 8 | FeCl$_3$ | 2 | 80 | 2090 | 3.76 | 1.26 |
| 9 | AlCl$_3$ | 2 | 80 | 1600 | 0.92 | 1.34 |
| 10 | SnCl$_4$ | 2 | 80 | 1127 | 8.14 | 1.26 |

EXAMPLE 11

Preparation of copolymer beads having a crosslinking degree of 5 mol %, and post-crosslinking reaction were carried out in an analogous manner as in Example 1, except for employing 1 g of FeCl$_3$. As a result, it was demonstrated that the surface area of the polymer beads is dramatically increased to 1590 m$^2$/g.

EXAMPLE 12

Preparation of copolymer beads having a crosslinking degree of 8 mol %, and post-crosslinking reaction were carried out in an analogous manner as in Example 1, except for employing 1 g of FeCl$_3$. As a result, it was demonstrated that the surface area of the polymer beads is dramatically increased to 1610 m$^2$/g.

EXAMPLES 13–15

Copolymer beads having a crosslinking degree of 2 mol % was prepared in an analogous manner as in Example 1, except for employing a mixture of styrene and vinylbenzylchloride in a molar ratio of 1:3, to control the amount of chloromethyl group on the copolymer beads. The copolymer beads had chloride content of 17.91% and swelling ratio of 2.01. Post-crosslinking polymerization was also carried out analogously as in Example 1, except for employing 5 g of copolymer bead and 200 ml of dichloroethane, and 24 hours of reaction, and the properties of polymer bead are summarized in Table 2 below.

TABLE 2

| Example | Catalyst | Catalyst Amount (g) | Reaction Temp. (° C.) | Surface Area (m$^2$/g) | Cl Content (%) | Swelling Ratio (v/v) |
|---|---|---|---|---|---|---|
| 13 | FeCl$_3$ | 1.00 | 80 | 1710 | 1.65 | 1.52 |
| 14 | AlCl$_3$ | 0.82 | 80 | 1300 | 2.46 | 1.62 |
| 15 | SnCl$_4$ | 1.16 | 80 | 1020 | 3.92 | 1.51 |

EXAMPLES 16–18

Copolymer beads having a crosslinking degree of 2 mol % were prepared in an analogous manner as in Example 13, except for employing a mixture of styrene and vinylbenzylchloride in a molar ratio of 1:1. The copolymer beads had chloride content of 13.18% and swelling ratio of 2.22. Post-crosslinking polymerization was also carried out analogously as in Example 13, and the properties of polymer bead are summarized in Table 3 below.

TABLE 3

| Example | Catalyst | Catalyst Amount (g) | Reaction Temp. (° C.) | Surface Area (m$^2$/g) | Cl Content (%) | Swelling Ratio (v/v) |
|---|---|---|---|---|---|---|
| 16 | FeCl$_3$ | 1.00 | 80 | 1060 | 0.88 | 2.21 |
| 17 | AlCl$_3$ | 0.82 | 80 | 210 | 2.74 | 1.76 |
| 18 | SnCl$_4$ | 1.16 | 80 | 8 | 1.75 | 1.78 |

EXAMPLES 19–21

Copolymer beads having a crosslinking degree of 2 mol % were prepared in an analogous manner as in Example 13, except for employing a mixture of styrene and vinylbenzylchloride in a molar ratio of 3:1. The copolymer beads had chloride content of 12.64% and swelling ratio of 2.27. Post-crosslinking polymerization was also carried out analogously as in Example 13, and the properties of polymer bead are summarized in Table 4 below.

TABLE 4

| Example | Catalyst | Catalyst Amount (g) | Reaction Temp. (° C.) | Surface Area (m$^2$/g) | Cl Content (%) | Swelling Ratio (v/v) |
|---|---|---|---|---|---|---|
| 19 | FeCl$_3$ | 1.00 | 80 | 2 | 0.47 | 1.83 |
| 20 | AlCl$_3$ | 0.82 | 80 | ~0 | 1.01 | 1.97 |
| 21 | SnCl$_4$ | 1.16 | 80 | ~0 | ND | 1.76 |

EXAMPLES 22–24

Macroporous-type copolymer beads having a crosslinking degree of 20 mol % were prepared in an analogous manner as in Example 1, except for employing 1000 ml of reactor, an aqueous phase containing 600 ml of distilled water, 30 g of poly(diallyldimethylammonium chloride) as a suspension stabilizer and 2 g of gelatin, and an organic phase containing 68.25 g of vinylbenzylchloride monomer, 33.14 g of divinylbenzene as a crosslinking monomer, 1.0 g of α,α'-azobisisobutyronitrile as an initiator, and a porogen of a mixture of 25 ml toluene and 75 ml isoamyl alcohol. The resultant copolymer beads had a crosslinking degree of 20 mol %, surface area of 58 m²/g, and swelling ratio of 1.37, and chloride content of 14.83%, respectively. Post-crosslinking polymerization was also carried out analogously as in Example 13, and the properties of polymer bead are summarized in Table 5 below.

TABLE 5

| Example | Catalyst | Catalyst Amount (g) | Reaction Temp. (° C.) | Surface Area (m²/g) | Cl Content (%) | Swelling Ratio (v/v) |
|---|---|---|---|---|---|---|
| 22 | FeCl₃ | 1.00 | 80 | 1055 | 2.93 | 1.11 |
| 23 | AlCl₃ | 0.82 | 80 | 620 | 8.51 | 1.21 |
| 24 | SnCl₄ | 1.16 | 80 | 475 | 9.16 | 1.38 |

EXAMPLES 25–29

Post-crosslinking of copolymer beads having a crosslinking degree of 20 mol % obtained in Example 22, was carried out in an analogous manner as in Example 1, except for employing 2.5 g of copolymer bead and 100 ml of dichloroethane, and the properties of polymer bead are summarized in Table 6 below.

TABLE 6

| Example | Catalyst | Catalyst Amount (g) | Reaction Temp. (° C.) | Surface Area (m²/g) | Cl Content (%) |
|---|---|---|---|---|---|
| 25 | FeCl₃ | 2.0 | 80 | 1130 | 2.91 |
| 26 | FeCl₃ | 1.0 | 80 | 1160 | 2.35 |
| 27 | FeCl₃ | 0.5 | 80 | 1070 | 2.19 |
| 28 | FeCl₃ | 0.25 | 80 | 1030 | 2.49 |
| 29 | FeCl₃ | 0.1 | 80 | 880 | 4.04 |

EXAMPLES 30–34

Post-crosslinking reaction of copolymer beads having a crosslinking degree of 20 mol % obtained in Example 22 was carried out in an analogous manner as in Example 1, except for employing 2.5 g of copolymer bead, 100 ml of dichloroethane and various reaction time, and the properties of polymer bead are summarized in Table 7 below.

TABLE 7

| Example | Catalyst | Catalyst Amount (g) | Reaction Temp. (° C.) | Time (hr) | Surface Area (m²/g) | Cl Content (%) |
|---|---|---|---|---|---|---|
| 30 | FeCl₃ | 1.0 | 80 | 3 | 1130 | 2.91 |
| 31 | FeCl₃ | 1.0 | 80 | 6 | 1120 | 3.19 |
| 32 | FeCl₃ | 1.0 | 80 | 9 | 1140 | 2.82 |
| 33 | FeCl₃ | 1.0 | 80 | 12 | 1130 | 2.91 |
| 34 | FeCl₃ | 1.0 | 80 | 15 | 1160 | 2.37 |

EXAMPLES 35–38

Post-crosslinking reaction of copolymer beads having a crosslinking degree of 20 mol % obtained in Example 22, was carried out in an analogous manner as in Example 1, except for employing 2.5 g of copolymer bead, and 100 ml of various swelling solvents disclosed in Table 8 below, and the properties of polymer bead are summarized in Table 8 below.

TABLE 8

| Example | Catalyst | Catalyst Amount (g) | Reaction Temp. (° C.) | Swelling Solvent | Surface Area (m²/g) | Cl Content (%) |
|---|---|---|---|---|---|---|
| 35 | FeCl₃ | 1.0 | 80 | dichloroethane | 1160 | 2.35 |
| 36 | FeCl₃ | 1.0 | 80 | chlorobenzene | 330 | 7.69 |
| 37 | FeCl₂ | 1.0 | 80 | hexane | 640 | 4.16 |
| 38 | FeCl₃ | 1.0 | 80 | chlorobenzene/hexane (1:1, v/v) | 860 | 2.43 |

EXAMPLES 39–41

Copolymer beads having a crosslinking degree of 20 mol % were prepared in an analogous manner as in Example 22, except for employing a mixture of styrene and vinylbenzylchloride in a molar ratio of 1:3. The copolymer beads had surface area of 9 m²/g, chloride content of 12.12% and swelling ratio of 1.36. Post-crosslinking polymerization was also carried out in an analogous manner as in Example 22, and the properties of polymer bead are summerized in Table 9 below.

TABLE 9

| Example | Catalyst | Catalyst Amount (g) | Reaction Temp. (° C.) | Surface Area (m²/g) | Cl Content (%) | Swelling Ratio (v/v) |
|---|---|---|---|---|---|---|
| 39 | FeCl₃ | 1.00 | 80 | 900 | 1.98 | 1.20 |
| 40 | AlCl₃ | 0.82 | 80 | 650 | 5.68 | 1.19 |
| 41 | SnCl₄ | 1.16 | 80 | 620 | 4.94 | 1.18 |

EXAMPLES 42–44

Copolymer beads having a crosslinking degree of 20 mol % were prepared in an analogous manner as in Example 22, except for employing a mixture of styrene and vinylbenzylchloride in a molar ratio of 1:1. The copolymer beads had surface area of 79 m²/g, chloride content of 7.42%, and swelling ratio of 1.14. Post-crosslinking polymerization was also carried out analogously as in Example 22, and the properties of polymer bead are summerized in Table 10 below.

TABLE 10

| Example | Catalyst | Catalyst Amount (g) | Reaction Temp. (° C.) | Surface Area (m²/g) | Cl Content (%) | Swelling Ratio (v/v) |
|---|---|---|---|---|---|---|
| 42 | FeCl₂ | 1.00 | 80 | 640 | 0.72 | 1.14 |
| 43 | AlCl₃ | 0.82 | 80 | 390 | 4.25 | 1.14 |
| 44 | SnCl₄ | 1.16 | 80 | 454 | 2.76 | 1.22 |

EXAMPLES 45–47

Copolymer beads having a crosslinking degree of 20 mol % were prepared in an analogous manner as in Example 22, except for employing a mixture of styrene and vinylbenzylchloride in a molar ratio of 3:1. The copolymer beads had surface area of 86 m²/g, chloride content of 4.11%, and swelling ratio of 1.25. Post-crosslinking polymerization was also carried out analogously as Example 22, and the properties of polymer bead are summarized in Table 11 below.

TABLE 11

| Example | Catalyst | Catalyst Amount (g) | Reaction Temp. (° C.) | Surface Area (m²/g) | Cl Content (%) | Swelling Ratio (v/v) |
|---|---|---|---|---|---|---|
| 45 | FeCl₃ | 1.00 | 80 | 470 | 0.45 | 1.35 |
| 46 | AlCl₃ | 0.82 | 80 | 440 | ND | 1.39 |
| 47 | SnCl₄ | 1.16 | 80 | 330 | 1.33 | 1.42 |

As clearly illustrated and demonstrated as aboves, the present invention provides a process for preparing polymer bead with increased surface area and pore volume. Though the surface area and pore volume of polymer beads may be varied depending on physical properties of copolymer beads and Friedel-Crafts reaction conditions, the present invention provides polymer beads with larger surface area than that of commercially available polymeric adsorbents produced by the conventional method employing a porogen only. Further, the polymer beads may be used as polymeric adsorbent and catalyst carrier, since they exhibit a high adsorption capacity for organic compounds in an aqueous solution, and chemically modified ones may be employed as polymer carrier, ion-exchange resin, and chelate resin.

What is claimed is:

1. A method for controlling the surface area and pore volume of a polymer bead, which method comprises the steps of
   suspension-polymerizing an organic phase comprising a chlorinated monovinyl monomer, a polyvinyl crosslinking monomer, and an initiator in an aqueous phase containing a suspension stabilizer to obtain a crosslinked copolymer bead with chloromethyl group, wherein the molar fraction of polyvinyl cross-linking monomer ranges from 0.20 to 0.80 of the total amount of monomers;
   swelling the copolymer bead in a swelling solvent selected from the group consisting of dichloroethane, dichlorobenzene, propylene dichloride, chlorobenzene, and hexane, and
   post-crosslinking the swollen copolymer bead in the presence of a Friedel-Crafts catalyst.

2. A process for preparing a post-crosslinked polymer bead with increased surface area and pore volume, which method comprises the steps of:
   suspension-polymerizing an organic phase comprising a chlorinated monovinyl monomer, a polyvinyl crosslinking monomer, and an initiator in an aqueous phase containing a suspension stabilizer to obtain copolymer bead with a chloromethyl group, wherein the molar fraction of polyvinyl cross-linking monomer ranges from 0.20 to 0.80 of the total amount of monomers; and,
   swelling the copolymer bead in a swelling solvent selected from the group consisting of dichloroethane, dichlorobenzene, propylene dichloride, chlorobenzene, and hexane; and
   post-crosslinking the swollen copolymer bead in the presence of a Friedel-Crafts catalyst.

3. The process for preparing a post-crosslinked polymer bead of claim 2, wherein the chlorinated monovinyl monomer is vinylbenzylchloride.

4. The process for preparing a post-crosslinked polymer bead of claim 3, wherein the vinylbenzylchloride organic phase further comprises styrene in a molar ratio of 1:3 to 3:1 of vinylbenzylchloride.

5. The process for preparing a post-crosslinked polymer bead of claim 2, wherein the chlorinated monovinyl monomer is comprised in a molar fraction of 0.25 to 0.92 in the organic phase.

6. The process for preparing a post-crosslinked polymer bead of claim 2, wherein the polyvinyl crosslinking monomer is divinylbenzene or trivinylbenzene.

7. The process for preparing a post-crosslinked polymer bead of claim 6, wherein the purity of the divinylbenzene ranges from 0.55 to 0.80 weight fraction.

8. The process for preparing a post-crosslinked polymer bead of claim 2, wherein the initiator is selected from the group consisting of azobisisobutyronitrile, t-butylperoxide, t-butylperoctoate, and t-butylperbenzoate.

9. The process for preparing a post-crosslinked polymer bead of claim 2, wherein the initiator is comprised in a ratio of 0.1 to 2.0 weight percent against the total monomers.

10. The process for preparing a post-crosslinked polymer bead of claim 2, wherein the organic phase further comprises a porogenic solvent.

11. The process for preparing a post-crosslinked polymer bead of claim 10, wherein the porogenic solvent is toluene, heptane, isooctane, t-amylalcohol, isoamyl alcohol or mixture thereof.

12. The process for preparing a post-crosslinked polymer bead of claim 10, wherein the porogenic solvent is comprised in a ratio of 50 to 80%(v/v) in the organic phase.

13. The process for preparing a post-crosslinked polymer bead of claim 2, wherein the suspension stabilizer is poly (diallyldimethylammonium chloride).

14. The process for preparing a post-crosslinked polymer bead of claim 2, wherein the Friedel-Crafts catalyst is selected from the group consisting of AlCl₃, SnCl₄, FeCl₃, BF₃, and HF.

15. The process for preparing a post-crosslinked polymer bead of claim 2, wherein the Friedel-Crafts catalyst is employed in a ratio of 0.02 to 1.2 weight fraction of the copolymer beads.

16. The process for preparing a post-crosslinked polymer bead of claim 2, wherein the post-crosslinking reaction is carried out at the temperature of 20° C. to 80° C.

17. A polymer bead prepared by
   suspension-polymerizing an organic phase comprising a chlorinated monovinyl monomer, a polyvinyl crosslinking monomer, and an initiator in an aqueous phase containing a suspension stabilizer to obtain copolymer bead with a chloromethyl group, wherein the molar fraction of polyvinyl crosslinking monomer ranges from 0.20 to 0.80 of the total amount of monomers, swelling the copolymer bead in a swelling solvent selected from the group consisting of dichloroethane, dichlorobenzene, propylene dichloride, chlorobenzene, and hexane, and post-crosslinking the swollen copolymer bead in the presence of a Friedel-Crafts catalyst.

18. The process of claim 3, wherein the organic phase further comprises a monomer selected from the group consisting of styrene, ethylstyrene, vinyltoluene, vinylpyridine, acrylonitrile and methyl methacrylate.

* * * * *